United States Patent
Gustavsson et al.

(10) Patent No.: US 9,958,903 B2
(45) Date of Patent: May 1, 2018

(54) PROVIDING A REPRESENTATION OF ORIENTATION AND MOVEMENT OF AN ITEM BEING MOVED IN SPACE

(71) Applicant: Sony Mobile Communications Inc., Tokyo (JP)

(72) Inventors: Jonas Gustavsson, Lomma (SE); Aleksandar Rodzevski, Malmo (SE); Markus Andreasson, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 66 days.

(21) Appl. No.: 14/699,522

(22) Filed: Apr. 29, 2015

(65) Prior Publication Data

US 2016/0320794 A1    Nov. 3, 2016

(51) Int. Cl.
*G06F 1/16*     (2006.01)
*A63F 13/428*   (2014.01)
(Continued)

(52) U.S. Cl.
CPC ............ *G06F 1/163* (2013.01); *A63F 13/211* (2014.09); *A63F 13/212* (2014.09); *A63F 13/32* (2014.09);
(Continued)

(58) Field of Classification Search
CPC ...... A63F 13/211; A63F 13/212; A63F 13/32; A63F 13/428; G06F 1/163; G06F 3/011; G06F 3/017; G06F 3/0346; G06F 3/0383
(Continued)

(56) References Cited

U.S. PATENT DOCUMENTS

| 2007/0054758 A1* | 3/2007 | Cockrell | A63B 69/0002 473/458 |
| 2007/0135225 A1* | 6/2007 | Nieminen | A63B 24/0006 473/212 |

(Continued)

FOREIGN PATENT DOCUMENTS

| EP | 1 533 678 A1 | 5/2005 |
| EP | 2 765 551 A1 | 8/2014 |

OTHER PUBLICATIONS

International Search Report from counterpart International Patent Application No. PCT/IB2015/057686, dated Jan. 29, 2016.

*Primary Examiner* — Tony Davis
(74) *Attorney, Agent, or Firm* — Tucker Ellis, LLP (57) ABSTRACT

The present invention relates to a method for providing a representation of orientation and movement of an item being moved in space by a user of the item. The user is wearing a wearable electronic device being physically separate from the item. The item comprises an item memory storing item defining data and a device communication unit. The wearable electronic device comprises an item communication unit, adapted to receive data from the device communication unit, and an orientation and movement detector. The method comprises retrieving, at the wearable electronic device, item defining data from the item; registering, at the wearable electronic device, orientation and movement of the wearable electronic device during user movement of the item; and computing, at a first processor, the representation of orientation and movement of the item based on the item defining data and the registered orientation and movement of the wearable electronic device.

27 Claims, 3 Drawing Sheets

(51) Int. Cl.

|  |  |
|---|---|
| *A63F 13/211* | (2014.01) |
| *A63F 13/212* | (2014.01) |
| *A63F 13/32* | (2014.01) |
| *G06F 3/01* | (2006.01) |
| *G06F 3/0346* | (2013.01) |
| *G06F 3/038* | (2013.01) |

(52) U.S. Cl.
CPC ............ *A63F 13/428* (2014.09); *G06F 3/011* (2013.01); *G06F 3/017* (2013.01); *G06F 3/0346* (2013.01); *G06F 3/0383* (2013.01)

(58) Field of Classification Search
USPC .................... 345/212–213, 461, 419, 156
See application file for complete search history.

(56) References Cited

U.S. PATENT DOCUMENTS

| | | | |
|---|---|---|---|
| 2007/0225054 A1* | 9/2007 | Okamoto | A63B 24/0021 463/3 |
| 2008/0070654 A1* | 3/2008 | Okamoto | A63F 13/10 463/3 |
| 2009/0058651 A1 | 3/2009 | Thorn | |
| 2013/0128022 A1 | 5/2013 | Bose | |
| 2015/0170421 A1* | 6/2015 | Mandella | G01B 21/04 345/419 |
| 2015/0328523 A1* | 11/2015 | Heling | A63B 69/3608 473/213 |
| 2016/0135036 A1* | 5/2016 | Rodzevski | H04W 8/205 455/41.2 |
| 2016/0144260 A1* | 5/2016 | Cohen | A63B 69/38 473/461 |

* cited by examiner

PROVIDING A REPRESENTATION OF ORIENTATION AND MOVEMENT OF AN ITEM BEING MOVED IN SPACE

TECHNICAL FIELD

The present invention relates to providing a representation of orientation and movement of an item being moved in space.

BACKGROUND

Simulating the movement and orientation of different items, e.g. tennis rackets, golf clubs, baseball bats, swords, stealing wheels, guitars for use in e.g. computer games are popular. The items are typically built up of a shell fitted to a hand control for a video game console. The simulation of the movement and orientation is then made by detecting movement and orientation of the hand control being part of the item. One example of a hand control used for this purpose is the hand control of the Nintendo® Wii™. An accelerometer and a gyroscope in the hand control are used for determining the motion and orientation of the item. These items are highly proprietary and with shapes and appearances that are non-realistic compare to actual items, such as sport/motion products.

SUMMARY OF THE INVENTION

In view of the above, it is an object of the present invention to provide a method for providing a representation of orientation and movement of an item being moved in space.

It is also an object of the present invention to provide a system for providing a representation of orientation and movement of an item being moved in space.

According to a first aspect a method for providing a representation of orientation and movement of an item being moved in space by a user of the item is provided. The user is wearing a wearable electronic device being physically separate from the item. The item comprises an item memory storing item defining data and a device communication unit. The electronic device comprises an item communication unit, adapted to receive data from the device communication unit, and an orientation and movement detector. The method comprising: retrieving, at the wearable electronic device, item defining data from the item; registering, at the wearable electronic device, orientation and movement of the wearable electronic device during user movement of the item; and computing, at a first processor, the representation of orientation and movement of the item based on the item defining data and the registered orientation and movement of the wearable electronic device.

The wearable electronic device may comprise a smart watch and/or a wristband. By a wearable device is meant a device that is adapted to follow movement of the user.

This method would be possible to run on applications natively installed on the wearable electronic device or have the wearable electronic device act as a gateway towards a console. Independent of both cases the communication system in the item will remain small and unsophisticated. The item just need to send out the item defining data and the rest of the intelligence will be handled by the wearable electronic device and/or at the console when the wearable electronic device act as a gateway towards the console. Hence, according to this method the item can maintain its natural appearance/shape and utilize the orientation and movement detector of the wearable electronic device. Hence, the item itself does not need to be equipped with the orientation and movement detector. The item memory and the device communication unit can be made very small and fitted to an already existing item, e.g. a sports product. Due to the strategic placement of the wearable electronic device (e.g. on the same hand as holding the item), together with the item defining data a simulation of the movement and orientation or the item can be made. The method results in increased number of possibilities to play different games without the need of production of proprietary controls or item shells for the different games. The method also gives a possibility to in a simple and cost effective manner simulate movement and orientation for e.g. a sports product in connection with training.

The method may further comprise computing, at a second processor, a visual representation of the item moving according to the computed representation of orientation and movement of the item.

The method may further comprise displaying, at a display, the visual representation of the item moving.

The device communication unit may be adapted to communicate with the item communication unit via a Body Area Network, BAN. The term BAN refers to a communication system where communication is entirely within, on, and in the immediate proximity of a human body. By Using BAN information pertaining to which item is used may be gained. Moreover, by using BAN it may also be determined that the item is actually used/held by the user. This since the BAN is using the user's body as being part of the BAN. Hence, the nature of BAN gives the possibilities for the wearable electrical device to adjust its detecting range so that a BAN connection only occurs when the item and the wearable electrical device is in connection with the same limb (arm, leg) of the user. By doing this the method can be implemented in a reliable manner making it deterministic to one limb only. One limb only will secure the detection of correct rotation and pendulum effects being generated by arm, hand and wrist movements of the item or being generated by leg, foot and ankle movements of the item.

The item defining data comprises data may define physical properties of the item. Data defining physical properties of the item may e.g. be size, weight, density distribution, center of gravity, inertia of mass and/or flexibility of the item. Additionally or in combination, data defining physical properties of the item may also be a visual appearance e.g. represented as a 3D model including textures. This can be used when rendering the item and its motion.

According to a second aspect a non-transitory computer-readable recording medium having recorded thereon a program which when executed on a wearable electronic device having processing capabilities is provided. The program of the non-transitory computer-readable recording medium is arranged for implementing: retrieving, via an item communication unit of the wearable electronic device, item defining data from a device communication unit of an item being physically separate from the wearable electronic device; registering, via an orientation and movement detector of the wearable electronic device, orientation and movement of the wearable electronic device during user movement of the item; and computing, via a processor of the wearable electronic device, a representation of orientation and movement of the item based on the item defining data and the registered orientation and movement of the wearable electronic device.

The device communication unit may be adapted to communicate with the item communication unit via a Body Area Network, BAN. If so, the program may further be arranged for implementing: detecting, via the BAN, that a user of the item is holding the item during user movement of the item.

The program may further be arranged for implementing: transmitting, via a console communicator of the wearable electronic device, the representation of orientation and movement of the item to a console.

The above mentioned features of method, when applicable, apply to this second aspect as well. In order to avoid undue repetition, reference is made to the above.

According to a third aspect a system adapted to provide a representation of orientation and movement of an item being moved in space by a user is provided. The system comprises the item, a first processor, and a wearable electronic device. The wearable electronic device is adapted to be worn by a user and is physically separate from the item. The item comprises: an item memory storing item defining data, and a device communication unit adapted to transmit the item defining data. The electronic device comprises: an item communication unit adapted to receive the item defining data from the device communication unit; and an orientation and movement detector adapted to register orientation and movement of the wearable electronic device during user movement of the item. The first processor is adapted to compute the representation of orientation and movement of the item based on the item defining data and the registered orientation and movement of the wearable electronic device.

The above mentioned features of method and program, when applicable, apply to this second aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
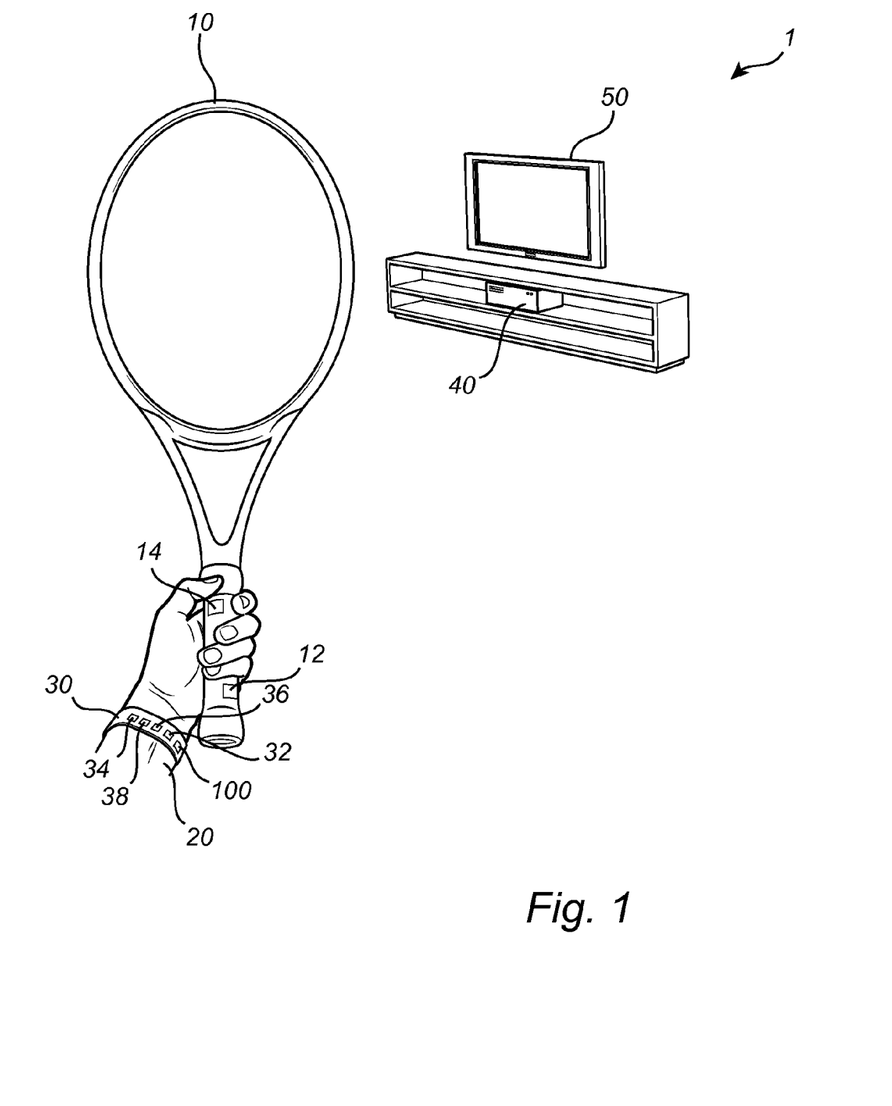
FIG. 1 illustrates a system adapted to provide a representation of orientation and movement of an item being moved in space by a user.

FIG. 1 illustrates an embodiment of a system 1 adapted to provide a representation of orientation and movement of an item 10 being moved in space by a user 20. By movement in space is meant movement in six degrees of freedom, 6DoF. 6DoF refers to the freedom of movement of a rigid item in three-dimensional space. Specifically, the item may translationally move along three perpendicular axes (forward/backward, up/down, left/right) combined with rotation about three perpendicular axes (pitch, yaw, and roll). The system 1 comprises the item 10, a first processor 100, and a wearable electronic device 30. In the embodiment of FIG. 1 the item 10 is a tennis racket, however it is to be understood that another type of item may as well be used, e.g. sports equipment (such as a baseball bat, tennis racket, golf club, etc.) or other types of items used for gaming and/or simulations (such as a steering wheel, a sword, a guitar, a flight joystick etc.). The wearable electronic device 30 is adapted to be worn by the user 20. The wearable electronic device 30 is physically separate from the item 10. The wearable electronic device 30 may e.g. be a smart watch a wristband, a ring and/or glove. According to the in FIG. 1 illustrated embodiment of the system the first processor 100 is arranged in the wearable electronic device 30. However, as will be apparent from embodiments disclosed below, the first processor 100 may be arranged elsewhere.

The item 10 comprises an item memory 12 storing item defining data and a device communication unit 14 adapted to transmit the item defining data to the wearable electronic device 30. The device communication unit 14 may e.g. be a transmitter or a transceiver.

The wearable electronic device 30 comprises an item communication unit 32 adapted to receive the item defining data from the device communication unit 14 of the item 10. The item communication unit 32 may e.g. be a receiver or a transceiver.

The communication between the item 10 and the wearable electronic device (30) may be represented by a on-body communication, referred to as Body Area Network (BAN), enabling communication within absolute vicinity of the body. Hence, the device communication unit 14 may be adapted to communicate with the item communication unit 32 via a BAN. The term BAN refers to a communication system where communication is entirely within, on, and in the immediate proximity of a human body. By using BAN identification of which item is held by the user and that an item is actually held by the user may be gained. Hence, the nature of BAN gives the possibilities for the wearable electrical device to adjust its detecting range so that a BAN connection only occurs when on the same hand. By doing this the applications of the system 1 can be implemented in a reliable manner making it deterministic to one hand only. One hand only will secure the detection of correct rotation and pendulum effects being generated by arm, hand and wrist movements of the item 10.

The BAN may be a bi-directional BAN. That makes it possible for both the item 10 and the wearable electronic device 30 to receive and send to each other data over the BAN. Since BAN can be used for bi-directional communications it would be possible to feed back data to the item 10 in order to trigger effects on the item 10. One example would be a game with a "laser" sword having the ability to generate light and/or sound effects. The wearable electronic device will then be able to send commands to the "laser" sword in order to generate light and/or sound effects. Another example would be a flight- or car-simulator where commands could be sent back to the item in form of a steering rod/wheel in order to generate haptic feedbacks.

Other possible implementation of the communication between the item 10 and the wearable electronic device 30 may e.g. be using RFID, Bluetooth or any other suitable Near Filed Communication protocol.

The item 10 may be equipped with a sensor (not shown) arranged to determine the layout of the grip used by the user 20 to hold the item 10. The sensor may be an integral part of the device communication unit 14, especially if the communication set up between the item 10 and the wearable electronic device is implemented using BAN.

The wearable electronic device 30 further comprises an orientation and movement detector 34 adapted to register orientation and movement of the wearable electronic device 30 during user movement of the item 10. By register orientation and movement of the wearable electronic device 30 during user movement of the item 10 and using the item defining data a 6DoF tracking of the item 10 may be realized. The orientation and movement detector 34 comprises at least one of an accelerometer, a gyroscope and a magnetometer. The orientation and movement detector 34 may further comprise at least one of a barometric pressure sensor, a temperature sensor, a humidity sensor and/or a light sensor. The barometric pressure sensor, the temperature sensor, the humidity sensor and/or the light sensor may be used for refined 6DoF tracking of the item 10.

The item defining data may comprise data defining physical properties of the item 10. Alternatively or in combination the item defining data may comprise an item ID. The Item ID may be individually unique for each item or item type unique. Item type may e.g. be one of tennis racket, golf club, baseball bat, etc. or the specific type of tennis racket, golf club, baseball bat, etc. In case the item defining data comprises an item ID the wearable electronic device 30 may, as for the embodiment illustrated in FIG. 1, further comprise a device memory 36 comprising data defining physical properties of the item 10 associated with the item ID. Data defining physical properties of the item may e.g. be size, weight, density distribution, center of gravity, inertia of mass and/or flexibility of the item. Additionally or in combination, data defining physical properties of the item may also be a visual appearance e.g. represented as a 3D model including textures. This can be used when rendering the item 10 and its motion. When having defining physical properties of the item simple algorithms can be used in order to track/record motions.

According to an alternative embodiment the system 1 may further comprises an external database (not shown) comprising data defining physical properties of the item associated with the item ID. In such case the wearable electronic device 30 further comprises a database communicator (not shown) adapted to retrieve the data defining physical properties of the item associated with the item ID from the external database. The database communicator is preferably arranged to wirelessly communicate with the external database.

The first processor 100 is adapted to compute the representation of orientation and movement of the item 10 based on the item defining data and the registered orientation and movement of the wearable electronic device 30. Especially, the first processor 100 is adapted to compute the representation of orientation and movement of the item 10 based on the data defining physical properties of the item 10 and the registered orientation and movement of the wearable electronic device. Hence, the first processor 100 is adapted to determine a 6DoF tracking of the item 10. The representation of orientation and movement of the item 10 may be stored in a memory before further use.

The system further comprises a console 40. The wearable electronic device 30 further comprises a console communicator 38 arranged to transmit the representation of orientation and movement of the item 10 to the console 40.

The system further comprises a second processor 200. The second processor 200 is adapted to compute a visual representation of the item moving according to the computed representation of orientation and movement of the item 10. According to the embodiment of FIG. 1 the second processor 200 is comprised in the console 40. However, as will be apparent from embodiments disclosed below, the second processor 200 may be arranged elsewhere. The visual representation of the item moving may be stored in a memory before further use.

The system 1 further comprises a display 50 adapted to display the visual representation of the item moving. The console may be arranged to feed data pertaining to the visual representation of the item 10 moving to the display 50.

Figure 2:
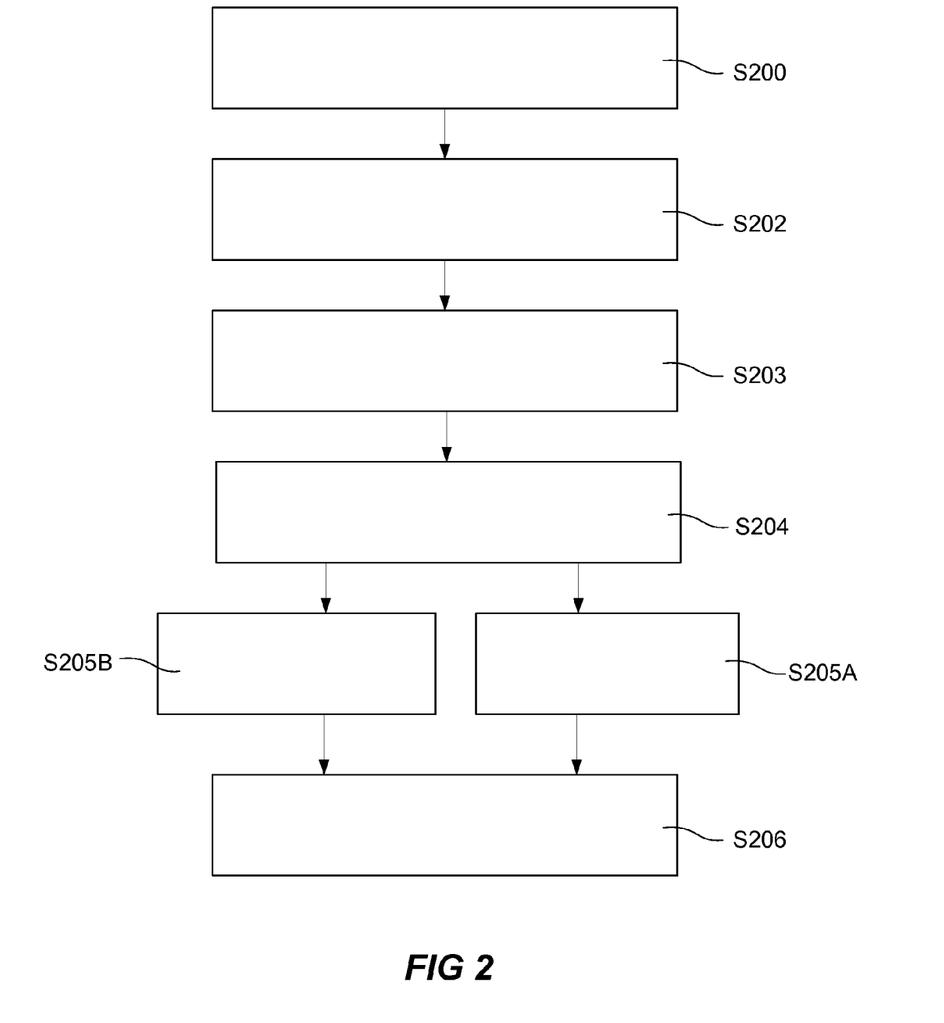
FIG. 2 is a block scheme of a method for implementation of providing a representation of orientation and movement of an item being moved in space by a user using a wearable electronic device.

The determining of the representation of orientation and movement of the item 10 may be implemented by an application installed on the wearable electronic device 30 in the form of a non-transitory computer-readable recording medium having recorded thereon a program which, when executed on a processor of the wearable electronic device 30, is arranged to influence the wearable electronic device 30 to perform the following, see FIG. 2: Retrieving S200, via the item communication unit 32, item defining data from the device communication unit 14 of the item 10; Registering S202, via the orientation and movement detector 34, orientation and movement of the wearable electronic device 30 during user movement of the item 10; and Computing S204, via the processor, the representation of orientation and movement of the item 10 based on the item defining data and the registered orientation and movement of the wearable electronic device 30.

The program may also be arranged to influence the wearable electronic device 30 to perform any one of the following acts: Detecting S203, via the BAN, that a user of the item is holding the item during user movement of the item; and/or Transmitting S206, via the console communicator 38, the representation of orientation and movement of the item to the console 40.

As mentioned above the item defining data may comprise data defining physical properties of the item. Additionally or in combination the item defining data comprises the item ID.

If so the program may be arranged to influence the wearable electronic device 30 to perform the act of Retrieving S205A, from the device memory 36, data defining physical properties of the item associated with the item ID. Alternatively or in combination, the program may be arranged to influence the wearable electronic device 30 to perform the act of Retrieving S205B, from the external database the data defining physical properties of the item associated with the item ID.

The act S204 of calculating the representation of orientation and movement of the item 10 is performed based on the data defining physical properties of the item and the registered orientation and movement of the wearable electronic device 30.

Figure 3:
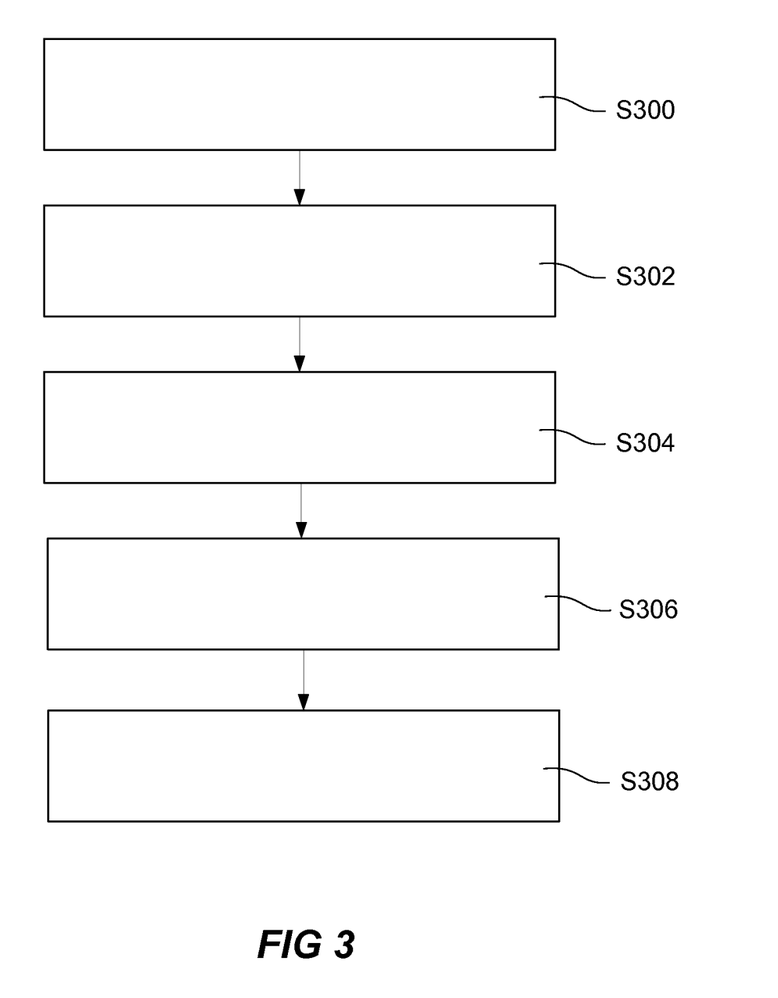
FIG. 3 is a block scheme of a method for providing a representation of orientation and movement of an item being moved in space by a user.

With reference to FIG. 3 a method for providing a representation of orientation and movement of the item 10 being moved in space by the user of the item will be discussed. The user is wearing the wearable electronic device 30. By a wearable device is meant a device that is adapted to follow movement of the user. The method comprises: Retrieving S300, at the wearable electronic device 30, item defining data from the item 10; registering S302, at the wearable electronic device 30, orientation and movement of the wearable electronic device 30 during user movement of the item 10; and computing S304, at the first processor 100, the representation of orientation and movement of the item 10 based on the item defining data and the registered orientation and movement of the wearable electronic device 30.

The method may further comprise computing 306, at a second processor 200, a visual representation of the item moving according to the computed representation of orientation and movement of the item 10 and displaying S308, at the display 50, the visual representation of the item moving.

An exemplifying implementation of how to provide a representation of orientation and movement of an item being moved in space will now be discussed. It shall be noticed that this is just an example of implementation and that various modification according to the above and below may be made. A item, being e.g. a sports equipment (e.g. a baseball bat, tennis racket, golf club, etc.), is equipped with a communication unit implementing BAN communication and a memory comprising item defining data. The item defining data may be data defining physical properties of the item, an URI indicating where to locate data defining physical properties of the item. Alternatively or in combination the item defining data may comprise an item ID data identifying the item. The item ID may then be used for finding data defining physical properties of the item in a database. The database may be located in the wearable electronic device or in an external database. A BAN equipped wearable electronic device, e.g. a wristband or a smart watch, is worn by the user in close proximity to the hand that holds the item. When the user grips the item the wearable electronic device connects to the item and reads out the physical properties of the item. It is also possible that the BAN connection between the item and the wearable electronic device triggers an activation of an associated application in a console (e.g. a mobile phone, game console or cloud enabled device). The wearable electronic device then starts recording its orientation and movement detector, e.g. accelerometer and gyrometer. The recorded data together with the physical properties of the item is then used for calculating a motion path and orientation of the item. The calculation is performed in the first processor. The first processor may be comprised in the wearable electronic device or in the console or elsewhere. The result of the calculation may be used in order to simulate a swing of the item.

The person skilled in the art realizes that the present invention by no means is limited to the preferred embodiments described above. On the contrary, many modifications and variations are possible within the scope of the appended claims.

For example, external database may be arranged in the console 40. Alternatively, the external database may be arranged in another device.

Moreover, instead of being comprised in the wearable electronic device 30 the first processor 100 may be comprised in the console 40. If so the console communicator 38 of the wearable electronic device 30 is arranged to transmit the item defining data and the registered orientation and movement of the wearable electronic device to the console 40.

Furthermore, instead of being comprised in the console 40 the second processor 200 may be comprised in the wearable electronic device 30. If so the console communicator 38 of the wearable electronic device 30 is arranged to transmit the visual representation of the item 10 moving according to the computed representation of orientation and movement of the item 10 to the console 40.

The first and second processors 100, 200 may be the same processor or different processors.

Additionally, variations to the disclosed embodiments can be understood and effected by the skilled person in practicing the claimed invention, from a study of the drawings, the disclosure, and the appended claims.

The invention claimed is:

1. Method for providing a representation of orientation and movement of an item being moved in space by a user of the item, the user wearing a wearable electronic device being physically separate from the item, the item comprising an item memory storing item defining data and a device communication unit, the electronic device comprising an item communication unit, adapted to receive data from the device communication unit, and an orientation and movement detector, the method comprising:
   retrieving, by the wearable electronic device, the item defining data from the item;
   determining, based on the item defining data, data defining physical properties of the item, wherein the physical properties of the item comprise one or more of size, weight, density distribution, center of gravity, inertia of mass, flexibility and visual appearance of the item,
   registering, at the wearable electronic device, orientation and movement of the wearable electronic device during user movement of the item; and
   computing, at a first processor, and independently of data from orientation or movement sensors of the item, the representation of orientation and movement of the item based on the data defining physical properties of the item and the registered orientation and movement of the wearable electronic device.

2. The method according to claim 1, further comprising computing, at a second processor, a visual representation of the item moving according to the computed representation of orientation and movement of the item.

3. The method according to claim 2, further comprising displaying, at a display, the visual representation of the item moving.

4. The method according to claim 1, wherein the device communication unit is adapted to communicate with the item communication unit via a Body Area Network, BAN.

5. The method according to claim 1, wherein the item defining data stored in the item memory comprises the data defining physical properties of the item.

6. The method according to claim 1, wherein the item defining data stored in the item memory comprises an item ID, wherein the wearable electronic device further comprises a device memory comprising the data defining physical properties of the item associated with the item ID.

7. The method according to claim 1, wherein the item defining data stored in the item memory comprises an item ID, wherein the wearable electronic device is further arranged to retrieve the data defining physical properties of the item associated with the item ID by communication, via a database communicator of the wearable electronic device, with an external database comprising the data defining physical properties of the item associated with the item ID.

8. A non-transitory computer-readable recording medium having recorded thereon a program which when executed on a wearable electronic device having processing capabilities is arranged for implementing:
retrieving, via an item communication unit of the wearable electronic device, item defining data from a device communication unit of an item being physically separate from the wearable electronic device;
determining, based on the item defining data, data defining physical properties of the item, wherein the physical properties of the item comprise one or more of size, weight, density distribution, center of gravity, inertia of mass, flexibility and visual appearance of the item;
registering, via an orientation and movement detector of the wearable electronic device, orientation and movement of the wearable electronic device during user movement of the item; and
computing, via a processor of the wearable electronic device, and independently of data from orientation or movement sensors of the item, a representation of orientation and movement of the item based on the data defining physical properties of the item and the registered orientation and movement of the wearable electronic device.

9. The non-transitory computer-readable recording medium according to claim 8, wherein the device communication unit is adapted to communicate with the item communication unit via a Body Area Network, BAN, and wherein the program is further arranged for implementing:
detecting, via the BAN, that a user of the item is holding the item during user movement of the item.

10. The non-transitory computer-readable recording medium according to claim 8, wherein the program is further arranged for implementing:
transmitting, via a console communicator of the wearable electronic device, the representation of orientation and movement of the item to a console.

11. The non-transitory computer-readable recording medium according to claim 8, wherein the item defining data comprises the data defining physical properties of the item.

12. The non-transitory computer-readable recording medium according to claim 8, wherein the item defining data comprises an item ID and wherein the determining the data defining physical properties of the item comprises:
retrieving, from a device memory of the wearable electronic device, the data defining physical properties of the item associated with the item ID.

13. The non-transitory computer-readable recording medium according to claim 8, wherein the item defining data comprises an item ID and wherein the determining the data defining physical properties of the item comprises:
retrieving, from an external database comprising the data defining physical properties of the item associated with the item ID and via a database communicator of the wearable electronic device, the data defining physical properties of the item associated with the item ID.

14. A system comprising an item, a first processor, and a wearable electronic device, the wearable electronic device is adapted to be worn by a user and is physically separate from the item, the system is adapted to provide a representation of orientation and movement of the item being moved in space by the user,
wherein the item comprises:
an item memory storing item defining data, and
a device communication unit adapted to transmit the item defining data;
wherein the item does not include any orientation or movement sensors;
wherein the electronic device comprises:
an item communication unit adapted to receive the item defining data from the device communication unit, and
an orientation and movement detector adapted to register orientation and movement of the wearable electronic device during user movement of the item;
wherein the first processor is configured to determine, based on the item defining data, data defining physical properties of the item, wherein the physical properties of the item comprise at least one of size, weight, density distribution, center of gravity, inertia of mass, flexibility and visual appearance of the item; and
wherein the first processor is adapted to compute the representation of orientation and movement of the item based on the data defining physical properties of the item and the registered orientation and movement of the wearable electronic device.

15. The system according to claim 14, wherein the device communication unit is adapted to communicate with the item communication unit via a Body Area Network, BAN.

16. The system according to claim 14, wherein the item defining data comprises the data defining physical properties of the item.

17. The system according to claim 14,
wherein the item defining data stored in the item memory comprises an item ID;
wherein the wearable electronic device further comprises a device memory comprising the data defining physical properties of the item associated with the item ID.

18. The system according to claim 14,
wherein the item defining data stored in the item memory comprises an item ID;
wherein the system further comprises an external database comprising the data defining physical properties of the item associated with the item ID;
wherein the wearable electronic device further comprises a database communicator adapted to retrieve the data defining physical properties of the item associated with the item ID from the external database.

19. The system according to claim 14, wherein the first processor is arranged in the wearable electronic device.

20. The system according to claim 14, wherein the system further comprises a console, wherein the wearable electronic device comprises a console communicator arranged to transmit the representation of orientation and movement of the item to the console.

21. The system according to claim 14, wherein the system further comprises a console comprising the first processor, wherein the wearable electronic device comprises a console communicator arranged to transmit the item defining data and the registered orientation and movement of the wearable electronic device to the console.

22. The system according to claim 14, wherein the system further comprises a second processor adapted to compute a visual representation of the item moving according to the computed representation of orientation and movement of the item.

23. The system according to claim 22, wherein second processor is arranged in the wearable electronic device.

24. The system according to claim 22, wherein the system further comprises a console comprising the first processor and the second processor, wherein the wearable electronic device comprises a console communicator arranged to transmit the item defining data and the registered orientation and movement of the wearable electronic device to the console.

25. The system according to claim 14, wherein the system further comprises a display adapted to display the visual representation of the item moving.

26. The system according to claim 14, wherein the orientation and movement detector comprises at least one of an accelerometer, a gyroscope and a magnetometer.

27. The system according to claim 14, wherein the wearable electronic device comprises a smart watch, a wristband, ring and/or glove.

* * * * *